T. EVANS.

Metallic Bail-Ears.

No. 5,578. Reissued September 23, 1873.

*Witnesses:*

Charles. M. Higgins.

Arthur C. Fraser.

*Inventor:*

Thomas Evans,

By his attorneys

Burke & Fraser.

AM. PHOTO-LITHOGRAPHIC Co. N.Y. (OSBORNE'S PROCESS)

UNITED STATES PATENT OFFICE

THOMAS EVANS, OF BRANCHPORT, NEW YORK.

IMPROVEMENT IN METALLIC BAIL-EARS.

Specification forming part of Letters Patent No. 24,451, dated June 21, 1859; reissue No. 3,063, dated August 4, 1868; extended seven years; reissue No. 5,578, dated September 23, 1873; application filed September 8, 1873.

*To all whom it may concern:*

Be it known that I, THOMAS EVANS, late of Watkins, in the county of Schuyler and State of New York, now of Branchport, in the county of Yates and State aforesaid, have invented certain Improvements in Metallic Ears for Attaching Bails to Pails and other Vessels; and I do hereby declare that the following is a full and exact description thereof, reference being had to the accompanying drawings and to the letters of reference marked thereon, in which—

Figure 1:
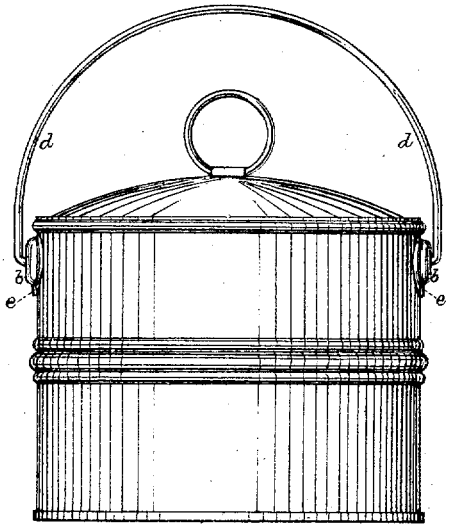
Figure 2:
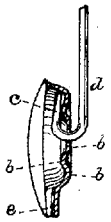
Figure 3:
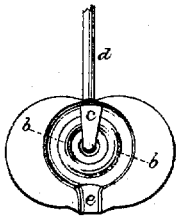
Figure 4:
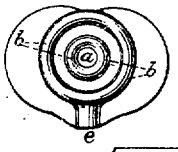
Figure 5:
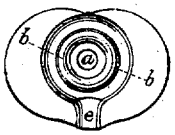
Figure 6:
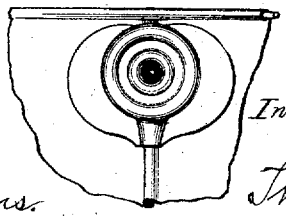

Figure 1 is an elevation, showing the ears applied to a pail. Fig. 2 is a vertical section of the ear, showing the manner of attaching the bail. Fig. 3 is a reverse elevation, showing the flattened end of the bail. Fig. 4 is a front elevation of the ear. Fig. 5 is a reverse elevation of the same. Fig. 6 is a detached view, showing the bail-ear as applied over the seam.

Similar letters refer to corresponding parts in all the figures.

My improvements are applicable to those ears which are used for affixing bails to tin pails and other vessels and wares, which are attached externally to the sides, and do not extend above the top, in which the end of the bail passes through an eye, and is bent in the form of a hook, which turns within the concave or raised portion of the ear; and they consist in an annular corrugation or corrugations surrounding the bail-orifice; in arranging the bail-hook so that its end may have an additional bearing upon or against the annular corrugation or corrugations; a raised portion surrounding the eye to receive the hook, in combination with a marginal portion or portions approximating to the plane of the surface of that part of the vessel to which the ear is to be attached, and a radial groove, being a continuation of the outer corrugation, fitting over the side seam of the vessel.

In my improved ear the eye *a* forms the center of a series of concentric corrugations, *b b b*, which may be more or less raised or depressed around it. These corrugations give increased strength to the part of the ear which rests on the bail, that being the point which receives all the weight of the vessel and its contents, and, consequently, requires unusual strength in comparison with the other parts. A swelled or convex ear, simply, is liable to be bent and drawn out of shape, and soon becomes useless from this cause, the material being too thin to retain its shape in ordinary use. This defect, though sufficiently overcome for ordinary purposes by the corrugations, I further provide against by making the end *c* of the bail *d* bear against one of the rings or corrugations *b*, (the outer one being the most convenient for the purpose,) by which the eye is relieved of a considerable portion of the strain coming upon it, and thereby is less affected. This renders the bail less subject to becoming loose, as the eye is prevented in a great measure by wearing larger from the double bearing which is thus given the bail. The corrugations may be more or less in number, as the size or thickness of metal may require. The end of the bail may be flattened after insertion, giving it a greater bearing-surface longitudinally of the corrugations, and likewise serving to prevent it from slipping out of the ear, as shown in Fig. 3; but this is not essential, as the ordinary round wire finds sufficient bearing, and cannot become detached if bent into the depression formed by the corrugations sufficiently. By a radial continuation of the outer corrugation a groove or channel, *e*, is formed on the lower side of the ear, which communicates with the interior cavity thereof, and is adapted to fit over the seam which occurs on one or both sides of a tin vessel. This feature possesses an important function for increasing the strength of the attachment, by acting as a brace against lateral strains received from concussions in handling, and also when the vessel is tipped in an inclined or horizontal position and supported by the bail, as when poured from, under which circumstances the weight of the vessel and contents bear upon the ear laterally. The strain thus produced is effectually resisted by this conformation, which presents a shoulder to the seam on both sides, greatly increasing the strength of the connection over that which would be due to the soldering of the plain surface only. And this groove being adapted to fit over or embrace the seam, the ear is more readily adjusted to its position, as well as more securely attached to the vessel, in consequence of its use. If desired, an opening may be left on the face of the seam in soldering, without materially reducing the strength, which will serve the additional purpose of a drip-passage, through which water that may have entered the interior cavity of the ear may escape, and thereby corrosion by rust be prevented. This form of ear is preferable in many respects. It renders pails and other vessels more comely in appearance and convenient to use than when the bail is attached above the top. It possesses greater strength and durability than the ordinary ears, and is far cheaper, being produced by the simple and almost instantaneous operation of a die or press instead of by hand-labor. Such ears are easily attached, either by solder or riveting, the surface being adapted for forming a good joint and strengthening the part to which they are attached by means of the marginal extension surrounding the raised portion, and conforming to the surface of the vessel to which they are applied.

I am aware that ears have been formed with a concave recess to receive the hook of the bail, and this, simply, I do not claim; but

What I claim as my invention, and desire to secure by Letters Patent, is—

1. Metallic ears for attaching the handles to pails and other vessels formed with concentric annular corrugations surrounding the bail-orifice, substantially as and for the purposes set forth.

2. So arranging the hooked ends of the bail as to give them an additional bearing against one or more of said corrugations, substantially as set forth.

3. A bail-ear formed with the portion surrounding the eye raised to receive the hooked end of the bail, when the marginal portion or portions thereof are formed on the plane of the part to which they are to be attached, substantially as set forth.

4. The groove *e*, formed by a radial continuation of the outer corrugation, and fitted to embrace the side seam of a tin vessel, substantially as and for the purposes set forth.

In witness whereof I have hereunto signed my name in the presence of two subscribing witnesses.

THOS. EVANS.

Witnesses:
M. S. BALDWIN,
SILAS KINNE.